UNITED STATES PATENT OFFICE.

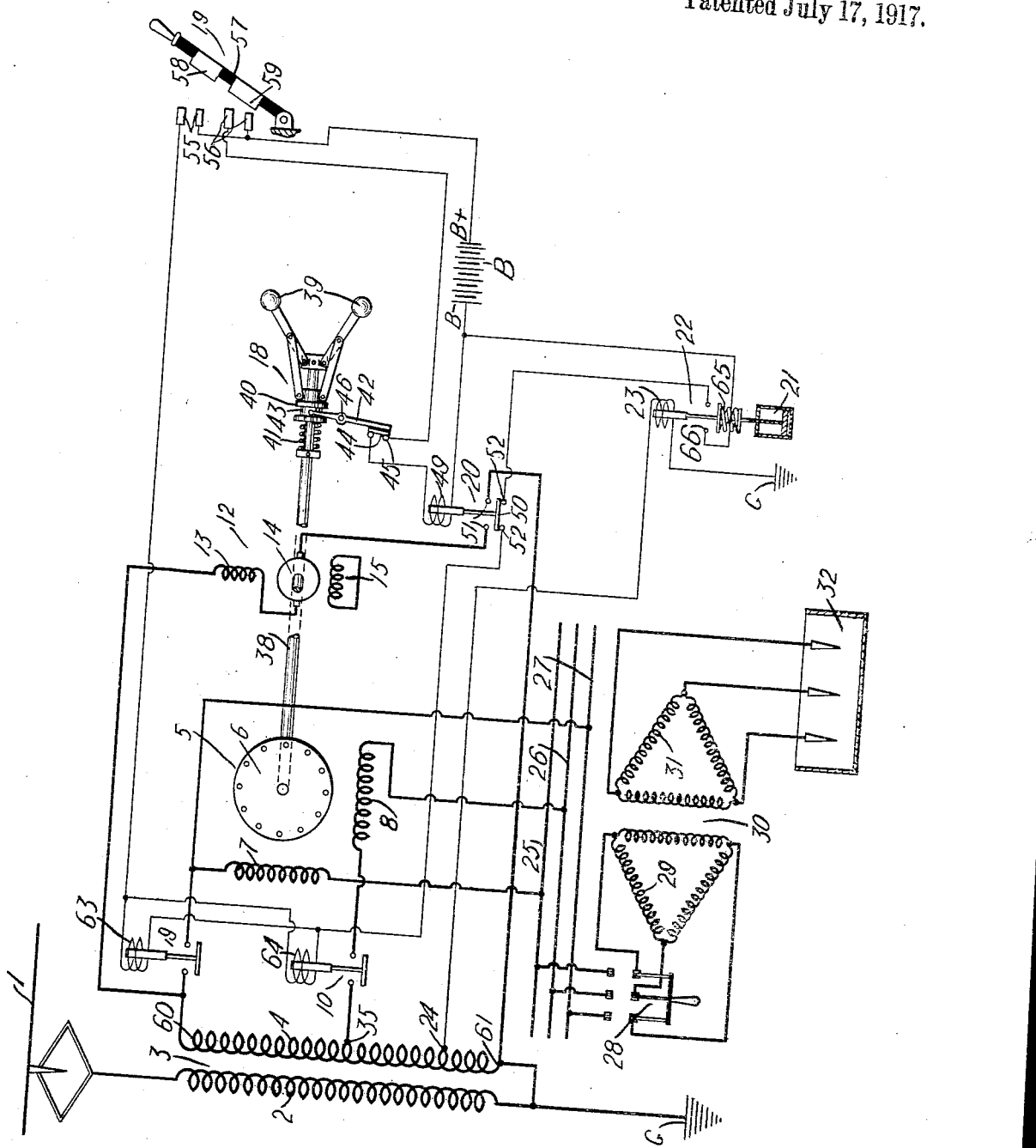

KARL A. SIMMON AND ARTHUR J. HALL, OF WILKINSBURG, PENNSYLVANIA, ASSIGNORS TO WESTINGHOUSE ELECTRIC AND MANUFACTURING COMPANY, A CORPORATION OF PENNSYLVANIA.

CONTROL SYSTEM.

1,233,411.  Specification of Letters Patent.  Patented July 17, 1917.

Application filed June 9, 1914. Serial No. 843,930.

*To all whom it may concern:*

Be it known that we, KARL A. SIMMON, a citizen of the United States, and a resident of Wilkinsburg, in the county of Allegheny and State of Pennsylvania, and ARTHUR J. HALL, a subject of the King of Great Brittain, and a resident of Wilkinsburg, in the county of Allegheny and State of Pennsylvania, have invented a new and useful Improvement in Control Systems, of which the following is a specification.

Our invention relates to control systems for dynamo-electric machines, with special reference to the control of phase converters which are employed for the purpose of converting single-phase alternating current energy into polyphase energy for use in connection with polyphase railway motors.

One of the objects of our invention is to provide a simple and effective system of the above indicated class which shall be adapted to automatically bring the phase converter up to full running speed, connect the converter to the source of energy and subsequently provide for disconnecting the phase converter from the source, in case the voltage thereof fails for a predetermined length of time.

Our invention may best be understood by reference to the accompanying drawing, the single figure of which is a diagrammatic view of a control system embodying our invention.

Referring to the drawing, the system shown comprises a plurality of supply conductors 1 and G for delivering energy to a primary winding 2 of a transformer 3 having a secondary winding 4; a phase converter 5 having a rotor 6, an exciting winding 7 and a secondary winding 8; a plurality of electrically operated transformer switches 9 and 10 for connecting the exciting winding 7 and the secondary winding 8 to the transformer winding 4; a starting motor 12 having a main field winding 13, an armature 14 and a commutating field winding 15 for accelerating the phase converter 5 and bringing it up to full running speed; a centrifugal switching device 18 and a master switch 19 for controlling an electrically operated starting switch 20 in circuit with the starting motor 12; a line relay 22 having an energizing coil 23 connected between a point 24 in the transformer winding 4 and the return circuit conductor G; a time-element device or dashpot 21 associated with said line relay 22 for delaying its action; a plurality of conductors or bus bars 25, 26 and 27 to which the transformer winding 4 and phase converter 5 are adapted to deliver three-phase energy; a line switch 28 for connecting primary windings 29 of the polyphase dynamo-electric machine 30 to said bus bars, the machine 30 having secondary winding 31 connected to an adjustable resistance or liquid rheostat 32 for governing the operation of said machine, and a battery B or other suitable source of energy.

The phase converter 5 is preferably of the induction motor type and its windings 7 and 8 are disposed in quadrature relation and are adapted to be connected respectively in multiple to the transformer winding 4 and to the midpoint 35 thereof, whereby balanced three-phase voltages are supplied to the bus bars 25, 26 and 27, in a well-known manner. Our invention is independent of the particular structure of the phase converter and its connections to certain portions of the system, and, although we have illustrated a converter adapted to produce three-phase energy for a three-phase dynamo-electric machine 30, our invention is, of course, equally applicable to two-phase apparatus.

The starting motor 12 is mechanically associated with a shaft 38 upon which the converter rotor 6 is mounted and said starting motor is conveniently supplied with energy from the transformer winding 4 through the starting switch 20, when raised to its upper position, although any other source of energy may be employed and, in fact, any other type of starting motor may be utilized.

The centrifugal device 18 is associated with the shaft 38 and may be of any well-known construction, and embodies a plurality of weights or balls 39 which are suitably associated with the shaft 38 and with a grooved sleeve 40, whereby longitudinal movement of said sleeve is effected under predetermined speed conditions when the centrifugal force acting upon the weights 39 is sufficient to throw them outwardly in the manner effected in any of the common types of fly-ball governors. A spring 41 is employed to restrain the movement of the centrifugal device 18. Associated with the grooved sleeve 40 is a lever 42, one end of which carries a roller 43 adapted for engagement with the sleeve 40 and the other end of which is provided with a conducting switch member 44 adapted, under initial conditions, to make coöperative engagement with stationary contact terminals 45. The lever 42 is pivoted, intermediate its ends, upon a pin 46.

The starting switch 20 embodies an energizing coil 49, a movable switch member 50 and a plurality of sets 51 and 52 of contact terminals, which sets are respectively adapted to be engaged by the switch member 50 when the starting is in its upper and lower positions. The dash-pot 21 may be adapted for any desired time element for delaying the opening of the line relay switch.

The master switch 19 comprises a plurality of sets of stationary contact terminals 55 and 56 and a movable member 57 having associated switch members 58 and 59 that are insulated, the one from the other. The arrangement of the several switch members and contact terminals is such that the contact terminals 56 are bridged by the switch member 59 prior to the connection of the terminals 55 by means of the switch member 58. Obviously, other types of switching apparatus for accomplishing this function may be employed, but the sequence of closure specified is essential, for a reason to be hereinafter set forth.

Assuming the circuit connections of the system to be as shown in the diagram, the operation thereof is as follows: The master switch 19 is first closed to complete a circuit from the B+ terminal of the battery B, which includes coöperating switch members 56 and 59 of the master switch 19, switch members 44 and 45 of the centrifugally operated switch 18, and energizing coil 49 of the starting switch 20 to the B— side of the battery. The starting switch 20 is thereby actuated to close, and a circuit is completed from the upper terminal 60 of the transformer winding 4, which includes the field winding 13 and armature 14 of the starting motor 12, and coöperating switch members 50 and 51 of the starting switch 20 to the terminal 61 of the transformer winding 4. Energy is thus supplied to the starting motor 12 which operates to bring the converter 5 up to full-speed running conditions.

The centrifugal device 18 is adjusted to operate at predetermined full-speed operation to effect the disengagement of the switch members 44 and 45, and, hence, when full-speed is attained, the weights 39 are thrown outwardly, and the movement thereof is transmitted to the lever 42, whereby switch member 44 is separated from its stationary terminals 45. Thus, the energizing circuit of the coil 49 of the starting switch 20 is interrupted and the switch member 50 is permitted to fall, thereby disengaging its stationary contact terminals 51 and engaging its lower terminals 52. In so doing, the starting switch 20 disconnects the starting motor 12 from the transformer winding 4.

At this point in the operation, the master switch 19 may be moved to cause its switch member 58 to bridge the contact terminals 55, so that, when the starting switch member 50 engages its lower terminals 52, a circuit is completed from the B+ side of the battery B which includes coöperating switch members 55 and 58 of the master switch 19, energizing coils 63, 64 of the transformer switches 9 and 10, coöperating switch members 52 and 50 of the starting switch 20 and coöperating switch members 65 and 66 of the line relay 22 to the other side of the battery B, provided that the source of energy is active and the line relay 22 occupies its raised position. Having completed the circuit just recited, transformer switches 9 and 10 are energized and closed to connect the converter windings 7 and 8 to the transformer winding 4, after which the phase converter 5 is operated therefrom and maintained at substantially its full running speed by reason of its peculiar electrical characteristics.

It is not essential that the master switch 19 cause the engagement of its contact members 55 and 58 after the starting motor 12 has been disconnected, but it is necessary that sufficient time be allowed, between the engagement of the switch members 59 and 58 with their corresponding terminals 56 and 55, to permit the starting switch 20 to be closed. Otherwise, the transformer switches 9 and 10 would be closed immediately to connect the phase converter 5, at rest, to the transformer winding 4.

Assuming that full running conditions obtain and that the phase converter 5 is connected to the transformer winding 4, the line switch 28 may be closed to connect the motor 30 to the bus bars 25, 26 and 27, after which the operation of the motor 30 may be governed, in the usual way, by means of the adjustable resistance device 32.

If, under running conditions, the voltage of the source fails, the line relay 22 is deenergized and its coöperating switch members 65 and 66 become disengaged after a predetermined time interval, which is determined by a time-element device or dash-pot 21. Thus, the energizing circuit of the transformer switches 9 and 10 is interrupted and the said switches are permitted to open to disconnect the phase converter 5 from the transformer winding 4. The time interval of the action of the dash-pot 21 is chosen to permit a relatively short interruption of the supply voltage, such, for instance, as may occur when an electric railway vehicle passes over a section break.

Our invention has been shown, for illustrative purposes, as embodying a specific arrangement of apparatus and circuit connections, but those skilled in the art will readily understand that, broadly considered, many modifications may be effected therein without departing from the spirit and scope of our invention.

We claim as our invention:

1. The combination with a source of energy, a dynamo-electric machine, and a starting motor therefor, of means for causing said starting motor to bring said machine up to speed, means independent of circuit conditions for disconnecting said starting motor under predetermined speed conditions, and means, dependent upon said disconnecting means and upon circuit conditions, for subsequently connecting said machine to said source.

2. The combination with a source of energy, a dynamo-electric machine, and a starting motor therefor, of means for causing said starting motor to bring said machine up to speed, means independent of circuit conditions for disconnecting said starting motor under predetermined speed conditions, and means, dependent upon said disconnecting means and upon circuit conditions, for subsequently connecting said machine to said source and for disconnecting said machine under predetermined circuit conditions.

3. The combination with a source of energy, a dynamo-electric machine, and a starting motor therefor, of means for causing said starting motor to bring said machine up to speed, means independent of circuit conditions for disconnecting said starting motor under predetermined speed conditions, and means, dependent upon said disconnecting means and upon circuit conditions, for subsequently connecting said machine to said source, and a time-element device coöperating with said last means for disconnecting said machine from said source a predetermined time-interval after a failure of voltage of said source.

4. The combination with a source of energy, a dynamo-electric machine and a motor for accelerating said machine, of switching apparatus for causing said motor to bring said machine up to speed, a centrifugal switch for disconnecting said starting motor independent of circuit conditions when full speed is attained, means dependent upon said switching means and means, dependent upon circuit conditions of said source of energy, for acting conjointly to connect said machine to said source, and a time-element device associated with said last means for disconnecting said machine from said source when predetermined circuit conditions obtain for a predetermined time interval.

5. The combination with a source of energy, a dynamo-electric machine and a motor for accelerating said machine, of an electrically operated starting switch for said motor, an initially closed centrifugally operated switch, and a master switch in the energizing circuit of said starting switch for connecting said motor to a source of energy, said centrifugally operated switch being adapted to effect the opening of said starting switch when full speed is attained, of means comprising an interlock switch associated with said starting switch, a voltage relay having a time-element device associated therewith, and a master switch for connecting said machine to said source subsequent to the opening of said starting switch, if the source of energy is intact, said relay being adapted to disconnect said machine from said source a predetermined time after said source of energy fails.

6. The combination with a source of energy, a dynamo-electric machine, switching means for connecting said machine to said source, a starting motor for bringing said machine up to speed, and switching means for connecting said starting motor to said source, of an initially closed centrifugally operated switch and a master switch for effecting the closure of said starting switching means, said centrifugally operated switch being adapted to disconnect said starting motor when a predetermined speed is attained, and means for subsequently closing said machine-connecting means under predetermined circuit conditions and for opening said last means under other predetermined circuit conditions.

7. The combination with a source of energy, a dynamo-electric machine, switching means for connecting said machine to said source, a starting motor for accelerating said machine, and switching means for connecting said starting motor to said source, of an initially closed centrifugally operated switch, and auxiliary means for effecting the closure of said starting switch means, said centrifugally operated switch being adapted to disconnect said starting motor under predetermined speed conditions, means for subsequently closing said machine-connecting means under predetermined circuit conditions, and for opening said last means under other predetermined circuit conditions, and means for delaying the operation of said last means.

In testimony whereof, we have hereunto subscribed our names this 23rd day of May, 1914.

KARL A. SIMMON.
ARTHUR J. HALL.

Witnesses:
H. T. MORRIS,
B. B. HINES.

Copies of this patent may be obtained for five cents each, by addressing the "Commissioner of Patents, Washington, D. C."